US012718535B2

(12) United States Patent
Qiu et al.

(10) Patent No.: US 12,718,535 B2
(45) Date of Patent: Aug. 25, 2026

(54) VECTOR BYPASS FOR GENERATIVE ADVERSARIAL IMAGE SEGMENTATION

(71) Applicant: INTERNATIONAL BUSINESS MACHINES CORPORATION, Armonk, NY (US)

(72) Inventors: Haoxiang Qiu, Tokyo (JP); Takayuki Osogami, Yamato (JP); Takayuki Katsuki, Tokyo (JP); Tomoya Sakai, Tokyo (JP); Tadanobu Inoue, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 348 days.

(21) Appl. No.: 18/533,221

(22) Filed: Dec. 8, 2023

(65) Prior Publication Data

US 2025/0191348 A1 Jun. 12, 2025

(51) Int. Cl.
*G06V 10/774* (2022.01)
*G06T 7/00* (2017.01)
(Continued)

(52) U.S. Cl.
CPC ........ *G06V 10/7753* (2022.01); *G06T 7/0002* (2013.01); *G06T 7/11* (2017.01);
(Continued)

(58) Field of Classification Search
CPC . G06T 2207/20081; G06T 2207/20084; G06T 2207/00; G06T 7/0002; G06T 7/10;
(Continued)

(56) References Cited

U.S. PATENT DOCUMENTS 11,645,833 B2 5/2023 Madani
12,141,990 B2 * 11/2024 Sun ........................ G06N 3/084
(Continued)

FOREIGN PATENT DOCUMENTS

CN 112734764 A 4/2021
CN 112991353 A 6/2021
(Continued)

OTHER PUBLICATIONS

Joyce et al., "Deep Multi-Class Segmentation Without Ground-Truth Labels," 1st Conference on Medical Imaging with Deep Learning (MIDL 2018), Published: Jul. 11, 2022, https://openreview.net/forum?id=S11Xr-3iM, 9 pages. (Year: 2022) (See IDS).*
(Continued)

*Primary Examiner* — Siamak Harandi
*Assistant Examiner* — Annie H Pham
(74) *Attorney, Agent, or Firm* — Caleb D. Wilkes

(57) ABSTRACT

A method, computer system, and a computer program product are provided. A visual inspection machine learning model is trained using a generative adversarial network. Within the generative adversarial network a vector bypass is implemented. By transmitting a vector embedding representation of an unlabeled image through the vector bypass, the vector embedding representation is transmitted around the visual inspection machine learning model and to a generator to assist with image reconstruction.

20 Claims, 3 Drawing Sheets

(51) Int. Cl.
*G06T 7/11* (2017.01)
*G06V 10/82* (2022.01)

(52) U.S. Cl.
CPC .... *G06V 10/82* (2022.01); *G06T 2207/20081* (2013.01); *G06T 2207/20084* (2013.01)

(58) Field of Classification Search
CPC .... G06T 7/90; G06T 7/40; G06T 7/11; G06V 10/764; G06V 10/7753; G06V 10/82; G06V 10/87; G06V 30/19113; G06N 20/20; G06N 3/0454
See application file for complete search history.

(56) References Cited

U.S. PATENT DOCUMENTS

| | | | | |
|---|---|---|---|---|
| 2022/0051416 | A1 | 2/2022 | Cao | |
| 2022/0076075 | A1 | 3/2022 | Madani | |
| 2025/0078229 | A1* | 3/2025 | Zhang | G06T 7/40 |

FOREIGN PATENT DOCUMENTS

| | | | |
|---|---|---|---|
| CN | 113204522 | A | 8/2021 |
| EP | 3576100 | A1 | 12/2019 |

OTHER PUBLICATIONS

Arjovsky et al., "Wasserstein GAN," arXiv:1701.07875v3 [stat.ML] Dec. 6, 2017, 32 pages.
Chow et al. "Anomaly detection of defects on concrete structures with the convolutional autoencoder," Advanced Engineering Informatics, vol. 45, Aug. 2020, 101105, https://www.sciencedirect.com/science/article/abs/pii/S1474034620300744, 6 pages. (Abstract Only).
Dosovitskiy et al., "An Image is Worth 16×16 Words: Transformers for Image Recognition at Scale," arXiv:2010.11929v2 [cs.CV] Jun. 3, 2021, 22 pages.
Duan et al., "Unsupervised Pixel-level Crack Detection Based on Generative Adversarial Network," ACM, ICMSSP2020, May 28-30, 2020, https://dl.acm.org/doi/10.1145/3404716.3404720, 5 pages.
Ganin et al., "Domain-Adversarial Training of Neural Networks," Journal of Machine Learning Research 17 (2016), arXiv:1505.07818v4 [stat.ML] May 26, 2016, 35 pages.
Goodfellow et al., "Generative Adversarial Nets," arXiv:1406.2661v1 [stat.ML] Jun. 10, 2014, 9 pages.
Gulrajani et al., "Improved Training of Wasserstein GANs," arXiv:1704.00028v3 [cs.LG] Dec. 25, 2017, 20 pages.
Hung et al., "Adversarial Learning for Semi-Supervised Semantic Segmentation," arXiv:1802.07934v2 [cs.CV] Jul. 24, 2018, 17 pages.
Joyce et al., "Deep Multi-Class Segmentation Without Ground-Truth Labels," 1st Conference on Medical Imaging with Deep Learning (MIDL 2018), Published: Jul. 11, 2022, https://openreview.net/forum?id=S11Xr-3iM, 9 pages.
Lee, "Pseudo-label : The simple and efficient semi-supervised learning method for deep neural networks," ICML 2013 Workshop : Challenges in Representation Learning (WREPL), Jul. 2013, 7 pages.
Lin et al., "Focal Loss for Dense Object Detection," arXiv:1708.02002v2 [cs.CV] Feb. 7, 2018, 10 pages.
Liu et al., "DeepCrack: A deep hierarchical feature learning architecture for crack segmentation," Neurocomputing 338 (2019), Jan. 22, 2019, https://www.sciencedirect.com/science/article/abs/pii/S0925231219300566?via%3Dihub, pp. 139-153.
Long et al., "Fully Convolutional Networks for Semantic Segmentation," arXiv:1411.4038v2 [cs.CV] Mar. 8, 2015, 10 pages.
Mondal et al., "Revisiting CycleGAN for semi-supervised segmentation," arXiv:1908.11569v1 [cs.CV] Aug. 30, 2019, 13 pages.
O'Shea et al., "An Introduction to Convolutional Neural Networks," arXiv:1511.08458v2 [cs.NE] Dec. 2, 2015, 11 pages.
Ronneberger et al., "U-Net: Convolutional Networks for Biomedical Image Segmentation," arXiv:1505.04597v1 [cs.CV] May 18, 2015, 8 pages.
Salton et al., "Introduction to Modern Information Retrieval," McGraw-Hill Computer Science Series, Oct. 1986, 15 pages. (Table of Contents and Preface only) (Table of Contents and Preface taken from 1983 edition).
Yang et al., "Feature Pyramid and Hierarchical Boosting Network for Pavement Crack Detection," IEEE Transactions on Intelligent Transportation Systems, Under Review, arXiv:1901.06340v2 [cs.CV] Jan. 25, 2019, 11 pages.
Yi-De et al., "Automated image segmentation using improved PCNN model based on cross-entropy," Proceedings of 2004 International Symposium on Intelligent Multimedia, Video and Speech Processing, Oct. 20-22, 2004, 5 pages.
Zhang et al., "Road Crack Detection Using Deep Convolutional Neural Network," IEEE, ICIP 2016, Aug. 19, 2016, https://ieeexplore.ieee.org/stamp/stamp.jsp?tp=&arnumber=7533052, pp. 3708-3712.
Zhu et al., "Unpaired Image-to-Image Translation using Cycle-Consistent Adversarial Networks," arXiv:1703.10593v7 [cs.CV] Aug. 24, 2020, 18 pages.
Zou et al., "DeepCrack: Learning Hierarchical Convolutional Features for Crack Detection," IEEE Transactions on Image Processing, vol. 28, Issue: 3, Mar. 2019, https://ieeexplore.ieee.org/document/8517148, 15 pages.

* cited by examiner

VECTOR BYPASS FOR GENERATIVE ADVERSARIAL IMAGE SEGMENTATION

BACKGROUND

The present invention relates generally to the fields of machine learning, computer vision, semantic segmentation, and generative adversarial machine learning networks.

SUMMARY

According to one exemplary embodiment, a computer-implemented method is provided. A visual inspection machine learning model is trained using a generative adversarial network. Within the generative adversarial network a vector bypass is implemented. By transmitting a vector embedding representation of an unlabeled image through the vector bypass, the vector embedding representation is transmitted around the visual inspection machine learning model and to a generator to assist with image reconstruction. A computer system and computer program product corresponding to the above method are also disclosed herein.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
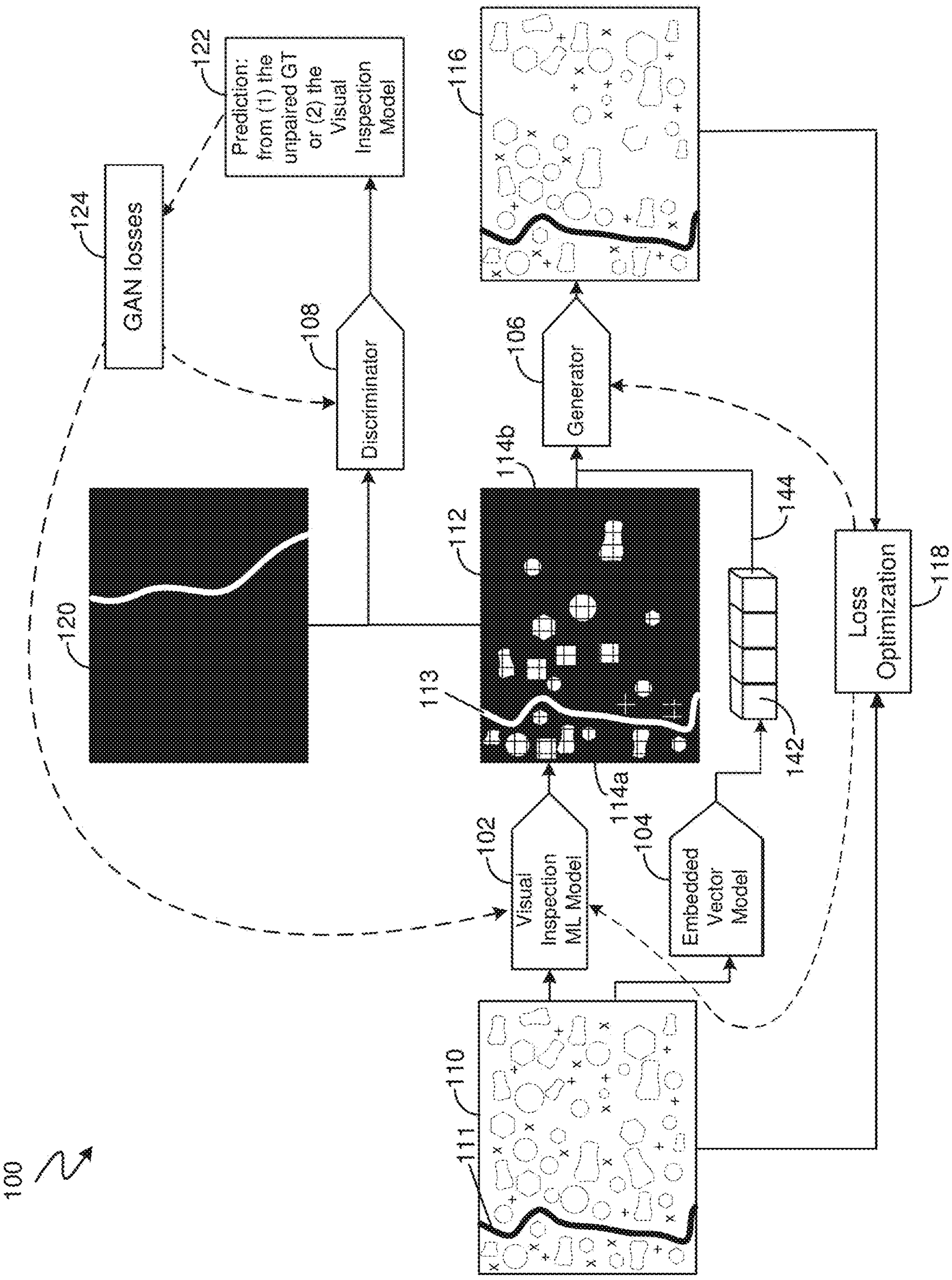
FIG. 1 illustrates a pipeline for generative adversarial computer vision and in which a vector bypass is implemented according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

According to an aspect of the invention, a computer-implemented method includes training a visual inspection machine learning model by using a generative adversarial network. Within the generative adversarial network a vector bypass is implemented. By transmitting a vector embedding representation of an unlabeled image through the vector bypass, the vector embedding representation is transmitted around the visual inspection machine learning model and to a generator to assist with image reconstruction.

In this manner, semantic segmentation performed by the so-trained visual inspection machine learning model is improved for unlabeled samples because the adversarial generative benefits are maintained while maintaining one or more features from an unlabeled sample. The method helps further avoid a need for manual label production for large datasets used to train a model for computer vision. In this way, some ground truth is able to be applied for the training even when the ground truth comes from a different data set or domain. The method allows a visual inspection machine learning model to quickly be trained and to have a quick start for implementation on a new data set for which no labeled training samples are available. The method could be applied in one example to train a model to detect defects in civil infrastructure by using images captured from an aerial camera such as a camera on a drone. The detection is able to be performed at a fine-grained level with segmentation models. The method helps alleviate image reconstruction problems that result from analyzing a binary segmentation output which includes one and zero values and which lacks additional image characteristics. The vector bypass balances losses that are used in the training.

According to a further development of the above-described method, the training includes inputting the unlabeled image into the visual inspection machine learning model to produce a segmentation result. The unlabeled image is also input into an embedding vector model to produce the vector embedding representation. The vector embedding representation and the segmentation result are input into the generator so that the generator produces a reconstructed image. An unpaired ground-truth image and the segmentation result are input into a discriminator of the generative adversarial network. A first loss for the generative adversarial network is optimized. The generative adversarial network includes the visual inspection machine learning model and the discriminator. A second loss for the visual inspection machine learning model and the generator is optimized based on a comparison of the reconstructed image and the unlabeled image. In this manner, artificial intelligence mimicry is harnessed to create and train a computer vision model to better recognize object features and/or object defects, even for samples from a new dataset. The bypass helps respond to suppression of background features that is caused by the discriminator of the generative adversarial network and improves the model accuracy while keeping the model architecture fairly simple.

According to a further development of one or more of the above-described methods, the unlabeled image and the unpaired ground-truth image contain a common feature. In this manner, knowledge from a different dataset, e.g., from a dataset from a different domain, is exploited to help improve artificial intelligence computer vision for a new domain.

According to a further development of one or more of the above-described methods, the discriminator produces predictions regarding origin of input data as the unpaired ground-truth image or as the input segmentation result. In this manner, the discriminator and the visual inspection machine learning model are pitted against each other in a zero-sum game to allow the visual inspection machine learning model to learn from unlabeled data.

According to a further development of one or more of the above-described methods, the optimizing of the first loss includes performing backpropagation on a min-max loss. In the min-max loss, the visual inspection machine learning model seeks to minimize the min-max loss and the discriminator seeks to maximize the min-max loss. In this manner, the discriminator and the visual inspection machine learning model are pitted against each other in a zero-sum game to allow the visual inspection machine learning model to learn from unlabeled data.

According to a further development of one or more of the above-described methods, the segmentation result includes an identification of a first feature shown in the segmentation result and in the unlabeled image. In this manner, artificial intelligence is deployed to help perform computer vision which is useful in a variety of industries such as manufacturing, physical structure inspection, e.g., building inspection, bridge inspection, vehicle inspection, etc., security, and troubleshooting.

According to a further development of one or more of the above-described methods, the second loss is a cycle consistency loss. In this manner, artificial intelligence for computer vision is improved by reducing the space of possible mapping functions by enforcing forwards and backwards consistency.

According to a further development of one or more of the above-described methods, the optimizing of the second loss for the visual inspection machine learning model and the generator based on the comparison of the reconstructed image and the unlabeled image includes performing L2 regularization. In this manner, artificial intelligence for computer vision is improved by executing penalty terms in the loss functions on the squares of the parameters of the model to avoid overfitting and to prevent oversizing.

According to a further development of one or more of the above-described methods, the vector embedding representation captures a first feature from the unlabeled image that is not present in the unpaired ground-truth image. In this manner, a better segmentation accuracy for the visual inspection machine learning model is achieved.

According to a further development of one or more of the above-described methods, the first feature is selected from a group consisting of a texture, a color, and a brightness. In this manner, a better segmentation accuracy for the visual inspection machine learning model is achieved by recognizing and analyzing an image characteristic.

According to a further development of one or more of the above-described methods, the first feature is a background feature. In this manner, the visual inspection machine learning model is trained to perform computer vision with increased accuracy.

According to a further development of one or more of the above-described methods, the visual inspection machine learning model attempts to produce the segmentation result to lack the first feature. In this manner, adversarial generative principles are implemented to help unlabeled samples benefit from labeled samples from different domains.

According to a further development of one or more of the above-described methods, the vector embedding representation includes a one-dimensional hidden embedding representing an image secondary feature of the unlabeled image. In this manner, localization information is inhibited from being passed to subsequent reconstruction stages to preserve the localization information for the segmentation result.

According to a further development of one or more of the above-described methods, image inspection is performed on a new image by inputting the new image to the trained visual inspection machine learning model. In this manner, artificial intelligence is deployed to help perform computer vision which is useful in a variety of industries such as manufacturing, physical structure inspection, e.g., building inspection, bridge inspection, vehicle inspection, etc., security, and troubleshooting.

According to a further development of one or more of the above-described methods, supervised training of the visual inspection machine learning model is performed by submitting a labeled image sample to the visual inspection machine learning model. In this manner, the artificial intelligence benefits are achieved not only for supervised training but also in the realm of semi-supervised training to help improve computer vision accuracy.

According to a further development of one or more of the above-described methods, the visual inspection machine learning model performs image segmentation. In this manner, object inspection via artificial intelligence is achieved with substantially improved accuracy and detail.

According to an aspect of the invention, a computer system includes one or more processors, one or more computer-readable memories, and program instructions stored on at least one of the one or more computer-readable memories for execution by at least one of the one or more processors to cause the computer system to train a visual inspection machine learning model by using a generative adversarial network and within the generative adversarial network to implement a vector bypass. By transmitting a vector embedding representation of an unlabeled image through the vector bypass, the vector embedding representation is transmitted around the visual inspection machine learning model and to a generator to assist with image reconstruction.

In this manner, the computer system improves object recognition performed by the so-trained visual inspection machine learning model for unlabeled samples because the adversarial generative benefits are maintained while maintaining one or more features from an unlabeled sample. The computer system helps further avoid a need for manual label production for large datasets used to train a model for computer vision. In this way, the computer system applies some ground truth for the training even when the ground truth comes from a different data set or domain. The computer system allows a visual inspection machine learning model to quickly be trained and to have a quick start for implementation on a new data set for which no labeled training samples are available. The computer system could be applied in one example to train a model to detect defects in civil infrastructure by using images captured from an aerial camera such as a camera on a drone. The detection is able to be performed at a fine-grained level with segmentation models. The computer system helps alleviate image reconstruction problems that result from analyzing a binary segmentation output which includes one and zero values and which lacks additional image characteristics. The vector bypass balances losses that are used in the training.

According to a further development of the above-described computer system, the training includes inputting the unlabeled image into the visual inspection machine learning model to produce a segmentation result. The unlabeled image is also input into an embedding vector model to produce the vector embedding representation. The vector embedding representation and the segmentation result are input into the generator so that the generator produces a reconstructed image. An unpaired ground-truth image and the segmentation result are input into a discriminator of the generative adversarial network. A first loss for the generative adversarial network is optimized. The generative adversarial network includes the visual inspection machine learning model and the discriminator. A second loss for the visual inspection machine learning model and the generator is optimized based on a comparison of the reconstructed image and the unlabeled image. In this manner, the computer system harnesses artificial intelligence mimicry to create and train a computer vision model to better recognize object features and/or object defects, even for samples from a new dataset. The bypass helps respond to suppression of background features that is caused by the discriminator of the generative adversarial network.

According to a further development of one or more of the above-described computer systems, the unlabeled image and the unpaired ground-truth image contain a common feature. In this manner, the computer system exploits knowledge from a different dataset, e.g., from a dataset from a different domain, to help improve artificial intelligence computer vision for a new domain.

According to a further development of one or more of the above-described computer systems, the discriminator produces predictions regarding origin of input data as the unpaired ground-truth image or as the input segmentation result. In this manner, the computer system pits the discriminator and the visual inspection machine learning model against each other in a zero-sum game to allow the visual inspection machine learning model to learn from unlabeled data.

According to a further development of one or more of the above-described computer systems, the optimizing of the first loss includes performing backpropagation on a min-max loss. In the min-max loss, the visual inspection machine learning model seeks to minimize the min-max loss and the discriminator seeks to maximize the min-max loss. In this manner, the computer system pits the discriminator and the visual inspection machine learning model against each other in a zero-sum game to allow the visual inspection machine learning model to learn from unlabeled data.

According to a further development of one or more of the above-described computer systems, the segmentation result includes an identification of a first feature shown in the segmentation result and in the unlabeled image. In this manner, the computer system deploys artificial intelligence to help perform computer vision which is useful in a variety of industries such as manufacturing, physical structure inspection, e.g., building inspection, bridge inspection, vehicle inspection, etc., security, and troubleshooting.

According to a further development of one or more of the above-described computer systems, the second loss is a cycle consistency loss. In this manner, the computer system improves artificial intelligence for computer vision by reducing the space of possible mapping functions by enforcing forwards and backwards consistency.

According to a further development of one or more of the above-described computer systems, the optimizing of the second loss for the visual inspection machine learning model and the generator based on the comparison of the reconstructed image and the unlabeled image includes performing L2 regularization. In this manner, the computer system improves artificial intelligence for computer vision by executing penalty terms in the loss functions on the squares of the parameters of the model to avoid overfitting and to prevent oversizing.

According to a further development of one or more of the above-described computer systems, the vector embedding representation captures a first feature from the unlabeled image that is not present in the unpaired ground-truth image. In this manner, the computer system achieves a better segmentation accuracy for the visual inspection machine learning model.

According to a further development of one or more of the above-described computer systems, the first feature is selected from a group consisting of a texture, a color, and a brightness. In this manner, the computer system achieves a better segmentation accuracy for the visual inspection machine learning model by recognizing and analyzing an image characteristic.

According to a further development of one or more of the above-described computer systems, the first feature is a background feature. In this manner, the computer system trains the visual inspection machine learning model to perform computer vision with increased accuracy.

According to a further development of one or more of the above-described computer systems, the visual inspection machine learning model attempts to produce the segmentation result to lack the first feature. In this manner, the computer system implements adversarial generative principles to help unlabeled samples benefit from labeled samples from different domains.

According to a further development of one or more of the above-described computer systems, the vector embedding representation includes a one-dimensional hidden embedding representing an image secondary feature of the unlabeled image. In this manner, localization information is inhibited from being passed to subsequent reconstruction stages and is preserved for the segmentation result.

According to a further development of one or more of the above-described computer systems, image inspection is performed on a new image by inputting the new image to the trained visual inspection machine learning model. In this manner, the computer system deploys artificial intelligence to help perform computer vision which is useful in a variety of industries such as manufacturing, physical structure inspection, e.g., building inspection, bridge inspection, vehicle inspection, etc., security, and troubleshooting.

According to a further development of one or more of the above-described computer systems, supervised training of the visual inspection machine learning model is performed by submitting a labeled image sample to the visual inspection machine learning model. In this manner, the computer system achieves artificial intelligence benefits not only for supervised training but also in the realm of semi-supervised training to help improve computer vision accuracy.

According to a further development of one or more of the above-described computer systems, the visual inspection machine learning model performs image segmentation. In this manner, the computer system achieves object inspection on a pixel basis via artificial intelligence with substantially improved accuracy and detail.

According to an aspect of the invention, a computer program product includes a computer-readable storage medium having program instructions embodied therewith. The program instructions are executable by a computer to cause the computer to train a visual inspection machine learning model by using a generative adversarial network and within the generative adversarial network to implement a vector bypass. By transmitting a vector embedding representation of an unlabeled image through the vector bypass, the vector embedding representation is passed around the visual inspection machine learning model and to a generator to assist with image reconstruction.

In this manner, the computer program product improves object recognition performed by the so-trained visual inspection machine learning model for unlabeled samples because the adversarial generative benefits are maintained while maintaining one or more features from an unlabeled sample. The computer program product helps further avoid a need for manual label production for large datasets used to train a model for computer vision. In this way, the computer program product applies some ground truth for the training even when the ground truth comes from a different data set or domain. The computer program product allows a visual inspection machine learning model to quickly be trained and to have a quick start for implementation on a new data set for which no labeled training samples are available. The computer program product could be applied in one example to train a model to detect defects in civil infrastructure by using images captured from an aerial camera such as a camera on a drone. The detection is able to be performed at a fine-grained level with segmentation models. The computer program product helps alleviate reconstruction problems that result from analyzing a binary segmentation output which includes one and zero values and which lacks additional image characteristics. The vector bypass balances losses that are used in the training.

According to a further development of the above-described computer program product, the training includes inputting the unlabeled image into the visual inspection machine learning model to produce a segmentation result. The unlabeled image is also input into an embedding vector model to produce the vector embedding representation. The vector embedding representation and the segmentation result are input into the generator so that the generator produces a reconstructed image. An unpaired ground-truth image and the segmentation result are input into a discriminator of the generative adversarial network. A first loss for the generative adversarial network is optimized. The generative adversarial network includes the visual inspection machine learning model and the discriminator. A second loss for the visual inspection machine learning model and the generator is optimized based on a comparison of the reconstructed image and the unlabeled image. In this manner, the computer program product harnesses artificial intelligence mimicry to create and train a computer vision model to better recognize object features and/or object defects, even for samples from a new dataset. The bypass helps respond to suppression of background features that is caused by the discriminator of the generative adversarial network.

According to a further development of one or more of the above-described computer program products, the unlabeled image and the unpaired ground-truth image contain a common feature. In this manner, the computer product exploits knowledge from a different dataset, e.g., from a dataset from a different domain, to help improve artificial intelligence computer vision for a new domain.

According to a further development of one or more of the above-described computer program products, the discriminator produces predictions regarding origin of input data as the unpaired ground-truth image or as the input segmentation result. In this manner, the computer program product pits the discriminator and the visual inspection machine learning model against each other in a zero-sum game to allow the visual inspection machine learning model to learn from unlabeled data.

According to a further development of one or more of the above-described computer program products, the optimizing of the first loss includes performing backpropagation on a min-max loss. In the min-max loss, the visual inspection machine learning model seeks to minimize the min-max loss and the discriminator seeks to maximize the min-max loss. In this manner, the computer program product pits the discriminator and the visual inspection machine learning model against each other in a zero-sum game to allow the visual inspection machine learning model to learn from unlabeled data.

According to a further development of one or more of the above-described computer program products, the segmentation result includes an identification of a first feature shown in the segmentation result and in the unlabeled image. In this manner, the computer program product deploys artificial intelligence to help perform computer vision which is useful in a variety of industries such as manufacturing, physical structure inspection, e.g., building inspection, bridge inspection, vehicle inspection, etc., security, and troubleshooting.

According to a further development of one or more of the above-described computer program products, the second loss is a cycle consistency loss. In this manner, the computer program product improves artificial intelligence for computer vision by reducing the space of possible mapping functions by enforcing forwards and backwards consistency.

According to a further development of one or more of the above-described computer program products, the optimizing of the second loss for the visual inspection machine learning model and the generator based on the comparison of the reconstructed image and the unlabeled image includes performing L2 regularization. In this manner, the computer program product improves artificial intelligence for computer vision by executing penalty terms in the loss functions on the squares of the parameters of the model to avoid overfitting and to prevent oversizing.

According to a further development of one or more of the above-described computer program products, the vector embedding representation captures a first feature from the unlabeled image that is not present in the unpaired ground-truth image. In this manner, the computer program product achieves a better segmentation accuracy for the visual inspection machine learning model.

According to a further development of one or more of the above-described computer program products, the first feature is selected from a group consisting of a texture, a color, and a brightness. In this manner, the computer program products achieves a better segmentation accuracy for the visual inspection machine learning model by recognizing and analyzing an image characteristic.

According to a further development of one or more of the above-described computer program products, the first feature is a background feature. In this manner, the computer program product trains the visual inspection machine learning model to perform computer vision with increased accuracy.

According to a further development of one or more of the above-described computer program products, the visual inspection machine learning model attempts to produce the segmentation result to lack the first feature. In this manner, the computer program product implements adversarial generative principles to help unlabeled samples benefit from labeled samples from different domains.

According to a further development of one or more of the above-described computer program products, the vector embedding representation includes a one-dimensional hidden embedding representing an image secondary feature of the unlabeled image. In this manner, localization information is inhibited from being passed to subsequent reconstruction stages to preserve the localization information for the segmentation result.

According to a further development of one or more of the above-described computer program products, image inspection is performed on a new image by inputting the new image to the trained visual inspection machine learning model. In this manner, the computer program product deploys artificial intelligence to help automate defect detection which is useful in a variety of industries such as manufacturing, physical structure inspection, e.g., building inspection, bridge inspection, vehicle inspection, etc., security, and troubleshooting.

According to a further development of one or more of the above-described computer program products, supervised training of the visual inspection machine learning model is performed by submitting a labeled image sample to the visual inspection machine learning model. In this manner, the computer program product achieves artificial intelligence benefits not only for supervised training but also in the realm of semi-supervised training to help improve computer vision accuracy.

According to a further development of one or more of the above-described computer program products, the visual inspection machine learning model performs image segmentation. In this manner, the computer program product achieves defect detection via artificial intelligence with substantially improved accuracy and detail.

A quick start of computer vision visual inspection on an unseen new dataset/domain is quite useful for many industries, but usually the computer vision requires preparing labeled training data on the dataset and training the model with the labeled training data. In some embodiments, the computer vision is intended to accurately detect a particular feature such as cracks, e.g., cracks in infrastructure or manufactured objects. Some computer vision is challenging due to diverse patterns and subtle contrast with backgrounds. The challenges are exacerbated by limited amounts of training data.

In some embodiments of the present disclosure, a cycle consistency-based semantic segmentation method is applied to utilize unlabeled data, specifically tailored for element detection such as crack detection. A regeneration of an original image is attempted by using the segmentation result. By separating images into primary element (e.g., crack) components and secondary image features (e.g., background texture) components during reconstruction for cycle consistency loss, the labeling cost on target datasets is reduced and a more efficient and cost-effective solution for object inspection and maintenance is offered.

Visual inspection is important in many industries including in detecting defects in civil engineering infrastructure. Cracks are a common defect in concrete buildings and roads. Identifying the cracks is helpful so that the lifespan of the infrastructure can be extended and potential breakdowns avoided by implementing time-sensitive repairs. Human inspectors can evaluate the conditions of the infrastructure by identifying the precise location, shape, and dimensions of cracks; however, such manual inspection is labor intensive and sometimes dangerous to human inspectors.

Automation of visual inspection helps speed up an inspection process and reduces risks to human inspectors. The technological advancement of drones has enhanced the potential of automated visual inspection to identify features such as cracks in a variety of structures in diverse locations. Photographic images taken by drones can be evaluated by automated computer vision. The present embodiments implement an enhanced computer vision model which in an example use case is used to evaluate the conditions of infrastructure. One example of the conditions is identifying cracks in captured images at the pixel level. It is challenging for computer vision models to perform crack detection with both high precision and high recall due to the nature of the cracks. First, because crack patterns are complex, and the shape and dimensions of cracks can vary substantially depending on the particular crack, it is difficult for a computer vision model to detect all types of cracks. Second, because the contrast between cracks and background is often unclear, vision models can mistake irregularities or patterns in the background texture for cracks. Semantic segmentation of cracks becomes particularly challenging when the amount of training data is limited. In practice, labor-intensive labeling is required to obtain such training data. For example, human inspectors trace the cracks in images to produce the training data.

To enable semantic segmentation of cracks without such labor-intensive labeling on images of every domain, at least some of the present embodiments implement a semi-supervised method, which trains a computer vision model with unlabeled data in the target domain in addition to labeled data in the source domain. The images have primary elements and secondary image features. For example, the images with cracks have two parts—cracks and background textures. While the shape and contrast of the cracks might differ across image samples, the background is fairly consistent in each image sample in a domain.

The present embodiments implement enhancements to a cycle generative adversarial network (cycle GAN) in order to achieve improved semantic segmentation which is especially useful in a use case of differentiating cracks from background textures. The segmentation network acts like a style transfer in CycleGAN, which maps images into binary masks (i.e., segmentation results). A generator is used to reconstruct the original images from the segmentation results. The segmentation network and the generator are trained to reduce the reconstruction loss. Information about the background information, e.g., texture information, is needed (in the segmentation results) to reconstruct the original image, but the segmentation results should only delineate desired features such as cracks and ignore background textures. The present embodiments implement a path in the neural network pipeline in such a way that image information, e.g., background information and/or texture information, as an embedding vector bypasses the segmentation network but can be used by the generator to reconstruct the original images with high quality. This information is passed directly to the generator via this bypass and, therefore, bypasses the segmentation result. In this way, unlabeled data is utilized to train the segmentation network, and yet the undesired image information does not enter and contaminate the segmentation results. These techniques in the proposed pipeline have shown to improve the segmentation accuracy of these models, e.g., to identify important visual elements such as cracks, whether in semi-supervised or unsupervised semantic segmentation. Some of the present embodiments apply the features to unsupervised semantic segmentation with minor modifications which facilitates seamless adaptation to various real-world scenarios.

Figure 3:
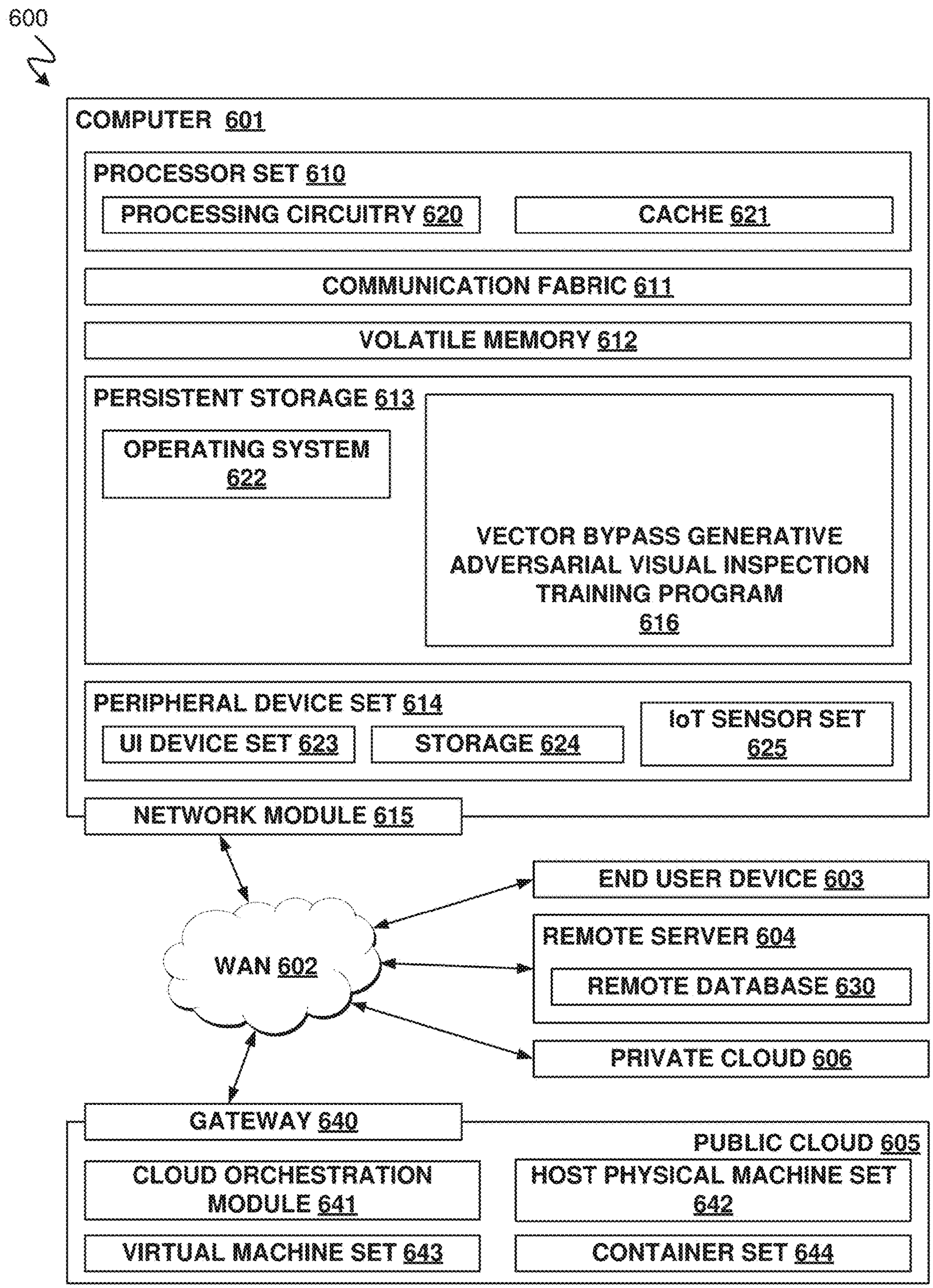
FIG. 3 illustrates a networked computer environment in which vector bypass for generative adversarial computer vision is performed according to at least one embodiment.

FIG. 1 illustrates a pipeline 100 with a vector bypass 144 added to a generative adversarial network for training a visual inspection machine learning model according to at least one embodiment. Various components and steps of this pipeline are part of, respectively performed by, and/or result from the vector bypass generative adversarial visual inspection training program 616 shown in the computing environment 600 of FIG. 3. The pipeline 100 includes four machine learning components including a visual inspection machine learning model 102, an embedded vector model 104, a generator 106, and a discriminator 108.

In a first example, the present techniques and system implement a semi-supervised semantic segmentation task for a test dataset/domain: $D^t$, by leveraging a labeled dataset $D^l$ with an unlabeled dataset $D^u$. Let $X \in \mathbb{R}^{H \times W \times 3}$ represent an image tensor of Height: H and Width: W. $Y \in \{0, 1\}^{H \times W \times 1}$ is the ground truth label tensor whose element represents the corresponding pixel in the image as being the element desired for detection, e.g., crack, (1) or not being the desired element, e.g., not being a crack. (0). These two tensors share the same width W and height H. The visual inspection machine learning model in this example is a segmentation model denoted as $f_\theta$: $\mathbb{R}^{H \times W \times 3} \rightarrow \mathbb{R}^{H \times W \times 1}$ which outputs the probability of the desired element (e.g., crack) for each pixel in the image. $f_\theta(X)$ represents the visual inspection machine learning model result, e.g., the semantic segmentation result. The labeled set $D^l$ contains pairs of image tensors $X^l$ and label tensors $Y^l$, while the unlabeled set $D^u$ only contains image tensors $X^u$ simulating real-world scenarios. The labels are not available for the newly acquired dataset (the unlabeled set). An evaluation set $D^t$ is used for assessing performance.

The datasets are formulated as:

$$D^l = \{(X_1^l, Y_1^l), (X_2^l, Y_2^l), (X_3^l, Y_3^l), \dots \}$$

$$D^u = \{(X_1^u, X_2^u, X_3^u, \dots \}$$

$$D^t = \{(X_1^t, Y_1^t), (X_2^t, Y_2^t), (X_3^t, Y_3^t), \dots \}$$

The labeling of tensor $Y_i$ is given by:

$$y_{i,j,k} = \begin{cases} 1 & \text{if pixel } (j, k) \text{ is part of an object, crack} \\ 0 & \text{if pixel } (j, k) \end{cases},$$

An optimization of the visual inspection model parameters θ is sought with $D^l$, $D^u$ in an attempt to achieve good performance on performance metrics, such as the pixel-wise Precision-Recall Area Under Curve, also known as Average Precision (AP), on the evaluation set:

$$\frac{1}{N}\sum_{i=1}^{N} m(Y_i^t, f_\theta(X_i^t))$$

$$m(Y_i^t, f_\theta(X_i^t)) = \frac{1}{H}\sum_{j=1}^{H}\frac{1}{W}\sum_{k=1}^{W} PR - AUC\left(y_{i,j,k}^t, f_\theta(X_i^t)_{j,k}\right.$$

where N is the number of samples in the evaluation set, and i is the i-th sample.

$$m(Y_i^t, f_\theta(X_i^t))$$

quantifies the performance of the segmentation against the ground truth labels.

At least some of the present embodiments implement semi-supervised semantic segmentation that focuses on optimizing segmentation results by a) adversarial loss $L_{sim}$ on the segmentation result to make the segmentation result more similar to the ground truth segmentation result, and b) cycle-consistency loss $L_{cyc}$ on the generated image from the segmentation result to ensure the segmentation model can capture the localization information of the image with a hidden embedding model $h_\theta$. There are four models in our proposed pipeline. which are (1) visual inspection model 102 (e.g., segmentation model) $f_\theta$: $\mathbb{R}^{H \times W \times 3} \rightarrow \mathbb{R}^{H \times W \times 1}$, (2) discriminator 108 $d_\theta$: $\mathbb{R}^{H \times W \times 1}$, (3) generator 106 (e.g., image regeneration model) $g_\theta$: $\mathbb{R}^{H \times W \times 3} \rightarrow \mathbb{R}^{H \times W \times 3}$, and (4) embedded vector model 104 (e.g., hidden embedding model) $h_\theta$: $\mathbb{R}^{H \times W \times 3} \rightarrow \mathbb{R}^{hdim}$. The overall loss function for training is shown below:

$$L_{all} = \alpha_1 L_{cls} + \alpha_2 L_{sim} + \alpha_3 L_{cyc} + \alpha_4 L_{dis}$$

where α is the weight of each loss as hyperparameter. $L_{dis}$ is the discriminator loss. $L_{cls}$ is the classification loss.

The visual inspection machine learning model 102 in at least some embodiments is a computer vision model. A computer vision model applies artificial intelligence that enables computers and systems to derive meaningful information from digital images, videos and other visual inputs. The computer vision allows the computer to automatically take actions and/or make recommendations based on the information that the computer derives from the images.

The visual inspection machine learning model 102 in at least some embodiments is an image segmentation model as a sub-type of a computer vision model. The image segmentation model performs image segmentation which is an end-to-end image analysis process that divides a digital image into multiple segments and classifies the information contained in each region. The image segmentation model performs a task of assigning labels to individual pixels in the image to mark the specific boundaries and shapes of different objects and regions in the image, classifying them by using information such as color, contrast, and/or placement within the image and other attributes.

The visual inspection machine learning model 102 in at least some embodiments is a semantic segmentation model as a sub-type of an image segmentation model. The semantic segmentation model assigns a class label to some or all of the pixels of an image that is analyzed. The semantic segmentation model outputs the possibility that each pixel belongs to an object or not. By determining the specific shapes and boundaries of entities in the image, the semantic segmentation model exceeds the performance capabilities of an image classification model alone or of an object detection model alone. Semantic segmentation lets the machine identify the precise locations of different kinds of visual information, as well as where each object begins and ends. The semantic segmentation produces a segmentation result or a segmentation map that classifies the analyzed image by applying visible features such as color, contrast, and/or placement within the image and/or by filling, e.g., with color, the area of a detected object.

The visual inspection machine learning model 102 receives a first unlabeled sample 110 which in this example is a digital image. The visual inspection machine learning model 102 attempts to find and locate one or more objects within the digital image. The reception of the digital image for analysis occurs in some embodiments via a transmission from a camera, e.g., from a camera connected to a computer. For example, the II device set 623 shown in FIG. 3 includes a camera that has a wired or wireless connection to the computer 601, that captures images and/or video in an environment, and transmits the captured images/video clips to the visual inspection ML model 102 which is also within the computer 601 or which communicates with the computer 601 over the wide area network 602. In this example, the visual inspection machine learning model 102 is trained to identify a defect in the object shown within the digital image.

For example, the visual inspection machine learning model 102 is trained to identify a crack in the object surface shown within the digital image. FIG. 1 shows that a first crack 111 is part of the digital image of the first unlabeled sample 110. The output of the visual inspection machine learning model 102 is an output image 112 also referred to as a segmentation result in which an identified object is highlighted by having a color or visual feature placed at its boundary outline. This output image 112 is referred to as a segmentation result due to its identification of one or more detected features, e.g., via highlighting the one or more detected features. A segmentation result is, essentially, a modification of the original image by coding (e.g., color coding) each pixel by its semantic class to create segmentation masks. This output image 112 is a ground-truth style image in which a label is present that includes a highlight/boundary outline of an object that is identified. For example, the output image 112 shown in FIG. 1 includes a highlighted crack 113 in which the color of the crack from the first unlabeled sample 110 changed (shown for example here as changing from black to white) for highlighting purposes. In remaining portions of the output image 112 in which no object-to-identify is recognized by the visual inspection machine learning model 102, the visual inspection machine learning model 102 deemphasizes these background portions, e.g., by blacking out these portions with color or changing the background portions into grayscale images in which information of a first feature such as color, texture, and/or brightness from the original image 110 is lost. For example, the output image 112 shown in FIG. 1 includes a first blacked-out portion 114*a* and a second blacked-out portion 114*b* which represent image segments/pixel area segments in which the areas were classified as background areas and in which no particular individual objects to identify were identified by the visual inspection machine learning model 102. The first blacked-out portion 114*a* and the second blacked-out portion 114*b* include some remnants of individual surface elements from the first unlabeled sample 110. The output image 112 includes such remnants due to being in training and not initially producing a perfect ground-truth style highlighted image in which all portions of the image segments without an identified object are deemphasized, e.g., darkened.

In some embodiments, the visual inspection machine learning model 102 is a fully convolutional network that employs locally connected layers and not dense layers. The locally connected layers include layers such as convolution layers, pooling layers, and/or upsampling layers.

In some embodiments, the visual inspection machine learning model 102 includes a U-Net architecture that includes a contracting path to capture context (e.g., global information) and a symmetrical expanding path to capture local information. These two paths can be symmetric to each other and form a u-shaped architecture. The U-Net architecture enables precise localization. The contracting path is a typical convolutional network that consists of repeated application of convolutions, each followed by a rectified linear unit (ReLU) and a max pooling operation. During the contraction, the spatial information is reduced while feature information is increased. The expansive pathway combines the feature and spatial information through a sequence of up-convolutions and concatenations with high-resolution features from the contracting path. A U-Net model supplements a contracting network by successive layers in which pooling operations are replaced by upsampling operators. These successive layers increase the resolution of the output. A successive convolutional layer can then learn to assemble a precise output based on this information, A U-Net includes a large number of feature channels in the upsampling part, which allow the network to propagate context information to higher resolution layers. As a consequence, the expansive path is more or less symmetric to the contracting part, and yields a u-shaped architecture. The network only uses the valid part of each convolution without any fully connected layers. To predict the pixels in the border region of the image, the missing context is extrapolated by mirroring the input image. Application of this tiling strategy helps avoid GPU memory-caused resolution limitations, especially for large images that are being inspected. Classification loss functions are implemented to train a semantic segmentation model for a classification task. In some embodiments such as for crack detection, a focal loss is used because the focal loss focuses on hard examples and the ratio of foreground to background is relatively low.

Other types of computer vision machine learning models are implemented in other embodiments as the visual inspection machine learning model 102. In some embodiments, the visual inspection machine learning model 102 includes a real-time object detection algorithm that is a deep convolutional neural network that is able to detect objects in videos, live feeds, and/or images. In some embodiments the deep convolutional neural network uses one by one convolutions, sorts objects in images into groups with similar characteristics, processes input images as structured arrays of data, and/or recognizes images between the structured arrays. In some embodiments the deep convolutional neural network divides an image into a grid and evaluates a confidence of each grid matching with a predetermined class. In some embodiments, the deep convolutional neural network performs classification and bounding box regression simultaneously. In some embodiments, the deep convolutional neural network is trained using independent classifiers and a classification loss, e.g., a binary cross-entropy loss, for class predictions. In some embodiments, the deep convolutional neural network implements a multilabel approach with multiple predictions per grid cell. In some embodiments the deep convolutional neural network implements a softmax for individual grid cells to push the prediction to one class per grid cell.

In some embodiments, the visual inspection machine learning model 102 includes a region-based convolutional neural network to perform computer vision. In some embodiments of the region-based convolutional neural network model, the model identifies a manageable number of candidate object regions and evaluates convolutional networks independently for each region of interest. Some of these embodiments deploy a region proposal network that simultaneously predicts object bounds and objectness scores at each position. Some of the models of these embodiments generate two output vectors per region of interest: softmax probabilities for object detection and per-class bounding-box regression offsets. In addition, some of these embodiments implement an attention mechanism to share convolutional features between region-based detectors and region proposal generators.

In some embodiments, the visual inspection machine learning model 102 includes a transformer as a pure transformer or together as a hybrid with a combination of the transformer and the convolutional neural network.

Other types of machine learning architecture are implemented for the visual inspection machine learning model 102 in other embodiments.

At least some of the present embodiments include the performance of supervised learning on the labeled dataset $D^l$ (unpaired ground truth image 120 is an example of one portion of the labeled dataset $D^l$) and add an unsupervised pipeline using images from both the labeled dataset and the unlabeled dataset (which includes unlabeled image 110). For the supervised part, at least some embodiments include a supervised semantic segmentation pipeline to leverage the labeled data. A pixel-wise cross entropy loss is used in some embodiments; however, a focal loss is used instead of cross-entropy loss for other embodiments because the focal loss helps achieve better element segmentation, e.g., crack segmentation.

$L_{cls}$ is expected classification loss $H(Y, f_\theta(X^l))$ in the training batch.

$$L_{cls} = \frac{1}{N}\sum_{i=1}^{N} H(Y_i, f_\theta(X_i^1))$$

where $$H(Y_i, f_\theta(X_i^1)) = \frac{1}{H}\sum_{j=1}^{H}\frac{1}{W}\sum_{k=1}^{W} H\left(y_{i,j,k}, f_\theta(X_i^1)_{j,k}\right)$$

and $$H\left(y_{j,k}, f_\theta(X^l)_{j,k}\right) = \begin{cases} -\left(1 - f_\theta(X^1)_{j,k}\right)^\gamma \log\left(f_\theta(X^l)_{j,k}\right) & \text{if } y_{j,k} = 1, \\ -f_\theta(X^l)_{j,k}^\gamma \log\left(1 - f_\theta(X^l)_{j,k}\right) & \text{if } y_{j,k} = 0. \end{cases}$$

The pipeline 100 includes a generator 106 which is a machine learning model which produces an image. The output image 112 or segmentation result that was generated by the visual inspection machine learning model 102 is input into the generator 106 and, in response, the generator 106 produces another image as an attempt to reconstruct the original image 110. For example, FIG. 1 shows the generator 106 as producing first reconstructed image 116. As explained above, the output image 112 lacks some aspects or features such as color, texture, brightness, etc. of the original image 110. The generator 106 seeks to restore those lost features and thereby produce a reconstructed image that recreates and replicates the original image 110. The generator 106 in various embodiments includes machine learning architecture similar to those alternatives described above for the visual inspection machine learning model 102, albeit with a slightly different input channel due to performing the different function (generate image copy instead of producing identification of detected feature/element). The generator 106 also has the input from the vector bypass 144 to assist in the image reconstruction. In some embodiments, the visual inspection machine learning model 102 and the generator 106 include the same architecture albeit in reversed formatting. In some embodiments, the visual inspection machine learning model 102 and the generator 106 include a different architecture such as the visual inspection machine learning model 102 including a transformer and the generator 106 including a U-Net architecture.

For training the visual inspection machine learning model 102 to better detect desired features, the pipeline 100 trains the generator 106 and the visual inspection machine learning model 102 by comparing the reconstructed image 116 to the original image 110 and adjusting weights and/or network values of the visual inspection machine learning model 102 and of the generator 106 based on optimizing loss from the comparison. For example, as shown in FIG. 1 the first reconstructed image 116 is compared to the original image 110, loss optimization 118 is performed for this comparison, and then the weights/values of the visual inspection machine learning model 102 and of the generator 106 are adjusted according to the loss optimization 118. The example of FIG. 1 shows that the first reconstructed image 116 produced by the generator 106 partially recreates the original image 110 but is still missing some of the textural elements. This partial recreation is an example of training progress occurring incrementally during training of the machine learning components of the pipeline 100. After additional iterations of loss optimization in training, the generator 106 will better be able to generate a reconstructed image that more closely approximates the original image. The loss for this loss optimization 118 is referred to as a second loss for the training.

In at least some embodiments, the loss optimization 118 from comparing the first reconstructed image 116 and the original image 110 includes performing regularization for the visual inspection machine learning model 102 and the generator 106. In at least some embodiments, the loss optimization 118 includes an L2 regularization by executing a loss function on the squares of the parameters of these models. This L2 regularization is also known as ridge regression, helps avoid overfitting during training, helps the models have short sizes, and prevents oversizing. For achieving L2 regularization, a term which is proportionate to the squares of the parameters of the model is added to the loss function. This term addition limits the size of the parameter and prevents parameters from growing out of control. A hyperparameter lambda (λ) which controls an intensity of the regularization also controls the size of the penalty term. The parameters hence will be smaller and the regularization is stronger with the greater lambda. The total loss formula includes the L2 regularization in some embodiments.

In some embodiments, the loss optimization 118 includes a cycle consistency loss where the reconstructed image 116 is supposed to be a copy of the original image 110. This approach uses transitivity to supervise the training of the model 102, the generator 106, and the embedded vector model 104. In at least some embodiments with a cycle consistency loss, one or more additional discriminators are implemented to help train the model 102 and the generator 106. In some embodiments, one additional discriminator is trained in a generative adversarial manner to work against the generator 106 and predict whether input samples originated as an original image or as a reconstructed image produced by the generator 106. The generator 106 and the model 102 and/or the embedded vector model 104 are adjusted based on this generative adversarial training and loss with the additional discriminator. The additional discriminator acts as a critic to automatically judge the reconstructive performance of the generator 106.

In other embodiments, other loss optimization techniques such as cosine similarity comparison or a Euclidean distance determination is used for the loss optimization 118 to optimize the model 102, the generator 106, and the embedded vector model 104. As part of the optimization, the embedded vector model 104 is adjusted in some embodiments to adjust its code to capture different or slightly different features from the original image 110.

Because the first output image 112 lacks some features, e.g., texture, brightness, and/or color, that the original image 101 had, the generator 106 often struggles to accurately produce a reconstructed image that closely approximates the original image as a copy. Because training of the various components is intertwined and happens simultaneously, this challenge affects the quality of the visual inspection machine learning model 102. Therefore, the pipeline 100 includes additional components including the embedded vector model 104 and the vector bypass 144 to help the generator 106 better perform image reconstruction. The embedded vector model 144 receives the original image 110 as an input and, in response, produces an embedded vector 142 that represents the original image 110. This embedded vector model 104 is part of a vector bypass 144 that bypasses the visual inspection machine learning model 102 and the first output image 112. Via the vector bypass 144, the embedded vector representation 142 is input into the generator 106 along with the first output image 112. The generator 106 uses both the first output image 112 and the embedded vector representation 142 to produce a reconstructed image, e.g., the first reconstructed image 116, that more closely approximates the original unlabeled image 110. The embedded vector representation 142 captures certain features such as a textural feature, a color feature, and/or a brightness feature which were lost in the first output image 112. The generator 106 uses this additional feature information from the embedded vector 142 to better understand how the original image 110 appeared and to better recreate the original image 110. The generator 106 is assisted via the bypass 144 to perform better reproduction accuracy on a segment-by-segment basis. In at least some embodiments, the embedded vector 142 includes segment-by-segment information about certain features that are present in the original image 110.

The bypass 144 constitutes a specialized pipeline into the image generation model (pipeline 100) to address the conflict between either the quality of image regeneration $L_{cyc}$, or the accuracy of segmentation $L_{cls}$ and $L_{dis}$. The specialized pipeline introduces a dedicated bypass 144 for background features (e.g., texture features) from the segmentation result $f_\theta(X)$, separating the path for the localization feature and the texture feature and balancing the detailed texture reconstruction against the segmentation accuracy. This bypass is particularly advantageous for segmentation tasks, where a background feature is mistaken as the element to identify. For example, a texture feature of the background image is mistaken to be deemed a crack.

The enhanced pipeline for image regeneration is $g_\theta(f_\theta(X), h_\theta(X))$ and $L_{cyc}$ is rewritten as follows:

$$L_{cyc} = \frac{1}{N}\sum_{i=1}^{N}\|X_i - g_\theta(f_\theta(X_i), h_\theta(X_i))\|^2$$

and includes the addition of a one-dimensional hidden embedding 142 ($h_\theta(X)$) that is transmitted through the bypass 144. The hidden embedding 142 is designed to preserve image secondary information (e.g., background information and/or texture information) during the process as an input to go aside from the segmentation result $f_\theta(X)$ to regenerate the image. Because binary segmentation results inherently lack background details, e.g., texture details, the hidden embedding serves as a reservoir for this crucial information. Consequently, the discriminator 108 and/or visual inspection machine learning model 102 (e.g., segmentation model) leverages this bypass 144 and absorbs the difference between images or domains for better segmentation performance. The embodiment of the hidden embedding 142 as a one-dimensional vector for each image helps serve as a bottleneck to inhibit the passage of localization information to the subsequent reconstruction stages, to ensure localization information is kept in the segmentation result $f_\theta(X)$.

Aside from the similarity loss $L_{sim}$, the cycle consistency loss $L_{cyc}$ quantifies the quality of image regeneration. This metric uses the original image X and reconstructed image $g_\theta(f_\theta(X))$ as input. In the framework of at least some embodiments, the regeneration quality is evaluated by computing the L2 distance between the original image tensor X and the regenerated image tensor $g_\theta(f_\theta(X))$. The segmentation result $f_\theta(X)$ must retain accurate localization information such as where the to-be-identified element (e.g., cracks) are to minimize the distance between X and $g_\theta(f_\theta(X))$. Backpropagating $L_{cyc}$ to both go and $f_\theta$ enhances $f_\theta$'s ability to preserve localization information, which is beneficial for crack segmentation.

The bypass 144 helps solve a conflict that either the quality of image regeneration $L_{cyc}$ or the accuracy of segmentation $L_{cls}$, and $L_{dis}$ controls or dominates. While the generator 106 ($g_\theta$) requires texture details to regenerate images effectively, optimizing for $L_{cyc}$ will inevitably introduce unwanted image secondary details into the segmentation results $f_\theta(X)$ from visual inspection machine learning model 102 because image secondary details (e.g., texture details) are required to minimize $L_{cyc}$. The bypass 144 helps facilitate regenerating an image closely resembling the original, which task was sometime deemed to be impossible by only using a purely binary segmentation result as input to the generator 106.

Although the embedded vector model 104 is shown in FIG. 1 as being entirely separate from the visual inspection machine learning model 102, in some instances the models 102 and 104 share an embedding layer. For this embodiment, the two models 102 and 104 share an initial embedding layer which produces a vector with more robust feature information which the visual inspection machine learning model 102 subsequently shrinks to form a tighter less informative embedding that it uses internally for production of the first output image 112 (as model 102 does not use or need the additional embedding information). The vector that leaves the shared layer and does not continue on further in the visual inspection machine learning model 102 is still deemed to bypass the visual inspection machine learning model 102 due to this exiting and not being further transmitted to other layers of the visual inspection machine learning model 102.

In at least some embodiments, the embedded vector model 104 includes a reduced structure compared to the visual inspection machine learning model 102 because the embedded vector model 104 produces as output an embedded vector 142 and does not perform additional actions on the embedded vector 142 (other than transmitting the embedded vector 142 forward along the vector bypass 144 in the pipeline 100). The other model (visual inspection machine learning model 102) also generates vectors but then performs additional analysis and/or actions on the vectors such as further pooling to reduce the vector size. The embedded vector model 104 includes an input layer which converts the data, e.g., image data, into a vector. The dimensions of the vector in some embodiments are equal to a number of features captured from the original image 110.

In some embodiments, the embedded vector model 104 also performs data normalization from data received from the original image 110.

In at least some embodiments, the vector embedding 142 and the output image 112 (segmentation result) are combined for inputting to the generator 106 by reweighting the embedding and image channel-wise for the intermediate feature map. Before the reweight vector is calculated the bypass vector 142 is fed to a two-layer neural network. This combination procedure is similar to channel attention but with an external input. In other embodiments, other attention mechanisms or concatenation are implemented for inputting these two elements to the generator 106.

The pipeline 100 includes a generative adversarial network that includes the visual inspection machine learning model 102 and the discriminator 108 working against each other. With this generative adversarial network, two neural network models (the visual inspection machine learning model 102 and the discriminator 108) contest with each other in the form of a zero-sum game where one of the model's loss is a gain for the other of the models. The discriminator 108 receives image samples as input data and, in response, produces predictions regarding origin of the input data. Using the discriminator 108 helps refine the segmentation result achieved by the visual inspection machine learning model 102 by leveraging unlabeled data or example.

FIG. 1 shows an unpaired ground-truth crack image 120 being input into the discriminator 108. The unpaired ground-truth image includes a feature that the model 102 should detect (is being trained to detect) in unlabeled samples, but the unpaired ground-truth image comes from a different domain or background than that from which the new unlabeled samples (e.g., including sample 110) come. Thus, in some embodiments the unpaired ground-truth image and the segmentation result produced by the model 102 share a common feature, e.g., in the example shown in FIG. 1 the common feature is an image of a crack. However, the original unlabeled image 110 also includes a feature, in this example texture for the background, that is not present in the unpaired ground-truth image 120. The unpaired ground-truth image 120 includes no texture, e.g., no texture for the background, as is common for a binary segmentation result. FIG. 1 also shows the output image 112 as being input into the discriminator 108. In response to receiving an input, the discriminator 108 provides a prediction 122 as to whether the input data was from a ground-truth (labeled) sample or was data generated by the visual inspection machine learning model 102. Thus, the discriminator 108 seeks to predict the origin as being either original (labeled ground truth, e.g., unpaired ground-truth image 120) or as being made by the model 102. During training of the pipeline 100 and the visual inspection machine learning model 102, the program 616 in at least some embodiments optimizes GAN loss 124 for the generative adversarial network (model 102 and discriminator 108) by performing backpropagation on a min-max loss. As part of this min-max loss optimization, the visual inspection machine learning model 102 seeks to minimize the loss 124 and the discriminator 108 seeks to maximize the loss 124. This GAN loss 124 is referred to as a first loss for the training in the pipeline 100. The generative adversarial network indirectly trains the model 102 by using the discriminator 108 to indicate how realistic the output images 112 are that the model 102 generates. The discriminator 108 is trained to predict how accurate the model 102—generated images (segmentation results) appear. The discriminator 108 and the model 102 are both updated dynamically via the adversarial loss training based on the GAN losses 124. The model 102 is not trained to minimize the distance to a specific image, but rather to fool the discriminator 108. This implementation of a generative adversarial network facilitates the possibility of unsupervised learning for the model and implements mimicry principles for learning.

The discriminator 108, represented by $d_\theta(f_\theta(X))$, is used to judge the quality of $f_\theta(X)$ to improve the visual inspection machine learning model 102 (e.g., segmentation model) by backpropagating the similarity loss $L_{sim}$. The segmentation model $f_\theta$ is intended to be equivalent to the generator 106, and similarity loss $L_{sim}$ is equivalent to generator loss in a typical GAN framework. $L_{sim}$ is the expected quality of segmentation result $d(f_\theta(X))$ by the discriminator $d_\theta$:

$$L_{sim} = -(\text{quality of } f_\theta(X) \text{ judged by } d_\theta)$$

and the discriminator loss is the following.

$$L_{dis} = -(d_\theta\text{'s ability to distinguish } f_\theta(X) \text{ from } Y)$$

By back-propagating the $L_{sim}$ to the segmentation model $f_\theta$, fθ will output a segmentation result more similar to the unpaired label tensor/ground truth $Y^l$, which is expected to lead to better segmentation accuracy.

For the discriminator 108 (*d*), in at least some embodiments a Wasserstein GAN with gradient penalty framework is implemented as the framework for the discriminator part for better training stability and faster, easier, hyperparameter search. This embodiment avoids a vanishing gradient problem. The gradient penalty helps enforce the 1-Lipschitz constraint on the discriminator 108.

$$L_{sim} = -\frac{1}{N}\sum_{i=1}^{N} d_\theta(f_\theta(X_i))$$

The discriminator loss with gradient penalty is the following.

$$L_{dis} = \frac{1}{N}\sum_{i=1}^{N}[d(Y_i) - d_\theta(f_\theta(X_i))] + L\frac{1}{N}\sum_{i=1}^{N}\left[\left(\left\|\nabla_{\hat{Y}_i} d_\theta(\hat{Y}_i\right\|_2 - 1\right)^2\right]$$

$\hat{Y}_i$ is sampled uniformly along straight lines between pairs of the segmentation result $f\theta(X_i)$ and label tensor $Y_i$.

In at least some embodiments, the visual inspection machine learning model 102 is a segmentation model: $f_\theta$ that includes a modified U-net architecture. The modified U-net architecture includes four down-sample convolution blocks and four up-sample convolution blocks with a skip connection between down-sample and up-sample blocks. In some embodiments, the number of channels of each layer is ¼. The improved detection via the bypass 144 is applied in other embodiments to other machine learning models that implement a neural network to perform image segmentation tasks. In one embodiment, the visual inspection machine learning model 102 was trained from scratch without transfer learning, using random initialized weights.

In some embodiments, the generator 106 is an image regeneration model: go that uses the same architecture as the visual inspection machine learning model 102 (segmentation model), with at least one difference being that the input channel is one instead of three and with the additional input of an embedding vector 142, e.g., a one-dimensional embedding. The embedding vector 142 is passed to fully connected layers, followed by a SoftMax layer to obtain the channel-wise attention weights. Then, the attention weights are multiplied channel-wise to the intermediate features in the generator 106.

In some embodiments, the embedded vector model 104 is indicated as ($h_\theta$) and is an intermediate output of a last down-sample block in the visual inspection machine learning model 102, followed by fully connected layers with an activation function.

In at least some embodiments, the discriminator 108 is indicated by (do) and is implemented as four down-sample blocks followed by a 1×1 convolution and a global average pooling layer. Each down-sample includes a 3×3 convolution layer and 3×3 max-pooling layer followed by a Leaky ReLU activation.

Figure 2:
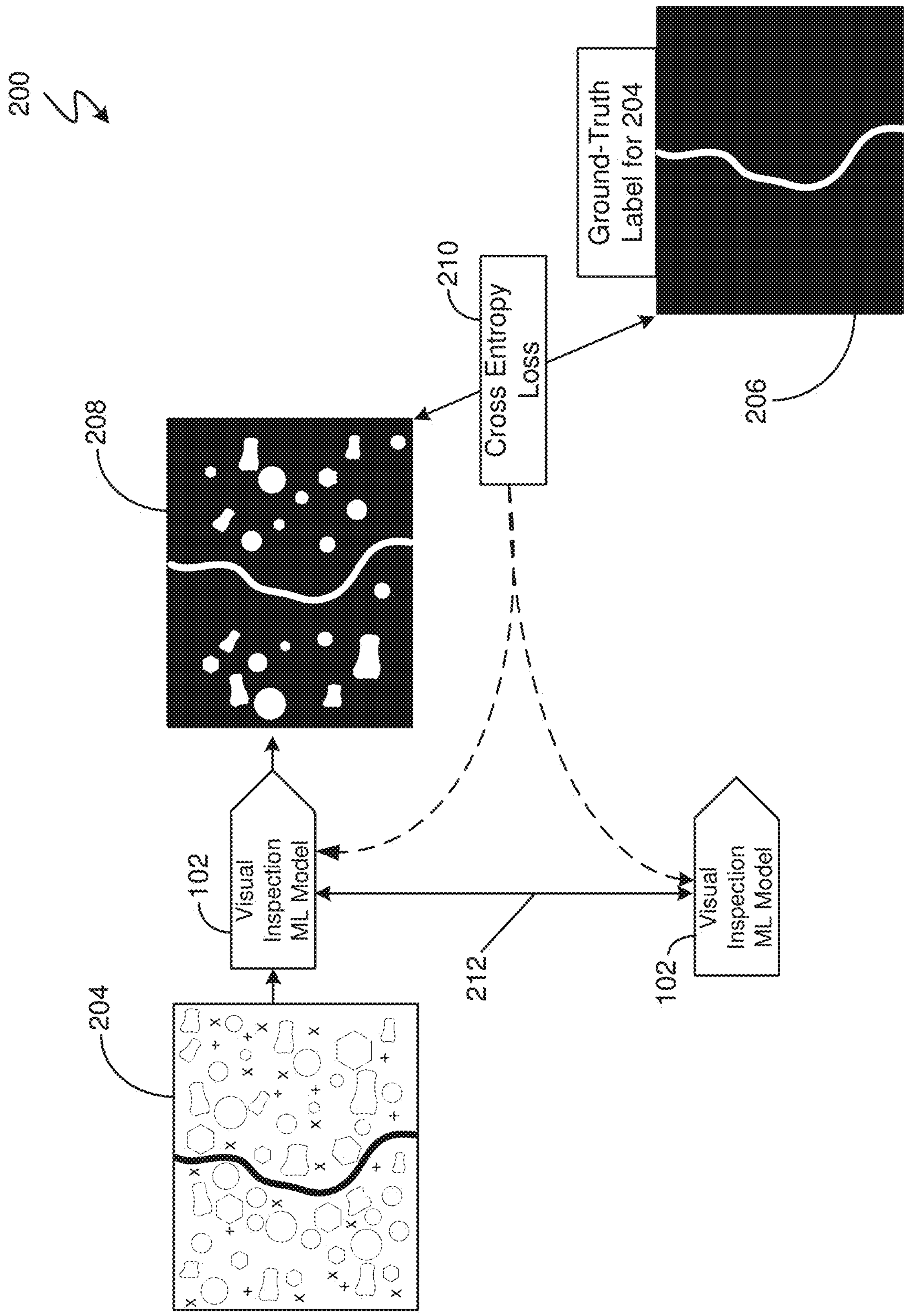
FIG. 2 illustrates a pipeline that is supplementary to the pipeline shown in FIG. 1 and in which some semi-supervised training of the image detection model is performed according to at least one embodiment.

FIG. 2 illustrates a supplementary pipeline 200 that builds on the pipeline 100 shown in FIG. 1 but also illustrates some semi-supervised training of the visual inspection machine learning model 102 being performed according to at least one embodiment. With this supplementary pipeline 200, in addition to the unsupervised training (using an unpaired ground-truth image) a labeled image is also used to help train the visual inspection machine learning model 102. Thus, with this combination of the unsupervised training shown in the pipeline 100 and the supervised training using one or more labeled samples shown in the supplementary pipeline 200, this supplementary pipeline 200 constitutes semi-supervised training for the visual inspection machine learning model 102.

FIG. 2 shows that the same visual inspection machine learning model 102 that is part of the first pipeline 100 of FIG. 1 is also further trained in the semi-supervised training of the supplementary pipeline 200 of FIG. 2. A labeled sample or a set of labeled samples are used in this supplementary pipeline 200. The labeled sample includes a base image 204 and a ground-truth image 206 that acts as the label. The labeled ground-truth image 206 includes the highlighted portion of the feature that is to be detected from the base image 204, in this case of the crack. The crack is shown in the base image 204 with black color and is shown in the labeled ground-truth image 206 with white color as a highlight of this crack feature. Like for the unpaired ground-truth image 120 of the pipeline 100 of FIG. 1, the background features and peripheral features that are not objects to detect are removed in the labeled ground-truth image 206. This removal is indicated by the remaining portions of the labeled ground-truth image 206 being black and having no texture information, color information, and no brightness information.

Although FIG. 2 shows the example supplementary pipeline 200 as including a second visual inspection machine learning model 102, in at least some embodiments these two elements are the same instance stored in the computer memory. The visual inspection machine learning model 102 produces an output image 208 which seeks to be a copy of the labeled ground-truth image 206. FIG. 2 shows an instance during the training when the training is not finished, so remnants of the secondary image features, e.g., background texture, are still visible in the output image 208. After additional training, these remnants will gradually go away from new output images 208. Then, a loss optimization, e.g., a cross entropy loss 210, is performed by comparing the labeled ground-truth image 206 and the output image 208, finding the difference(s), and then adjusting the parameters of the visual inspection machine learning model 102 to try to produce another output image which more closely approximates the labeled ground-truth image 206. Thus, these adjustments contribute to the final trained model 102 of this embodiment. The output image 208 still shows some remnants of background texture because the copy 202 is still being trained and over time improves the quality of its output images to better copy or approximate the ground-truth label 206. Other embodiments could include the supervised learning on an actual copy of the visual inspection machine learning model 102, but weight and parameter modifications for the copy model would need to be transferred over to the original visual inspection machine learning model 102.

Whether being trained solely by the pipeline 100 or additionally via the supplementary pipeline 200, the trained visual inspection machine learning model 102 is then deployed for usage for computer vision. For example, a new image is input to the trained visual inspection machine learning model and the trained visual inspection machine learning model 102 detects one or more defects therein and produces a segmentation result in which the detected defect is highlighted and image portions without any object-to-detect are deemphasized, e.g., darkened. In at least some embodiments, the output image is presented on a display screen, e.g., on a display screen of the computer 601 shown in FIG. 3. In some embodiments, the identification of a particular feature generates a warning indicator, e.g., an audible and/or visible warning indicator. For example, the computer 601 shows a warning on its display screen and/or plays a warning message over a speaker connected to the computer 601. In some embodiments, the program 616 causes a pause to machine operations in response to the identification of a particular feature. For example, if a crack is identified in an object being manufactured, the program 616 stops further assembly steps and/or construction steps so that the crack can be remedied or the sample can be removed from the assembly process to avoid wasting further materials on a defective base element.

The computer vision model training with the pipeline 100 and optionally the supplementary pipeline 200 showed improvements in computer vision for the trained model as compared to other models which did not include the training of pipeline 100 and did not include the vector bypass of the visual inspection model. These improvements were shown via the implementation of one or more test datasets. In some embodiments the test performance was quantified through the Average Precision (AP) due to the significant foreground-background imbalance in the binary ground truth masks, where the background vastly outnumbers the crack pixels. AP, also known as PR-AUC, provides a more informative performance measure for imbalanced dataset. In some testing, a hyperparameter search for each method was performed with five separate experimental runs for each parameter set to identify the best hyperparameter configuration.

In some embodiments, horizontal and vertical flip data augmentation was performed during the training for the samples.

It may be appreciated that FIGS. 1-2 provide only illustrations of certain embodiments and do not imply any limitations with regard to how different embodiments may be implemented. Many modifications to the depicted embodiment(s), e.g., to particular steps, elements, and/or order of depicted methods or components of a pipeline, may be made based on design and implementation requirements.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 600 contains an example of an environment for the execution of at least some of the computer code involved in performing the inventive methods, vector bypass generative adversarial visual inspection training program 616. In addition to vector bypass generative adversarial visual inspection training program 616, computing environment 600 includes, for example, computer 601, wide area network (WAN) 602, end user device (EUD) 603, remote server 604, public cloud 605, and private cloud 606. In this embodiment, computer 601 includes processor set 610 (including processing circuitry 620 and cache 621), communication fabric 611, volatile memory 612, persistent storage 613 (including operating system 622 and vector bypass generative adversarial visual inspection training program 616), peripheral device set 614 (including user interface (UI) device set 623, storage 624, and Internet of Things (IoT) sensor set 625), and network module 615. Remote server 604 includes remote database 630. Public cloud 605 includes gateway 640, cloud orchestration module 641, host physical machine set 642, virtual machine set 643, and container set 644.

COMPUTER 601 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 630. As is well understood in the art of computer technology, and depending upon the technology, performance of a computer-implemented method may be distributed among multiple computers and/or between multiple locations. On the other hand, in this presentation of computing environment 600, detailed discussion is focused on a single computer, specifically computer 601, to keep the presentation as simple as possible. Computer 601 may be located in a cloud, even though it is not shown in a cloud in FIG. 6. On the other hand, computer 601 is not required to be in a cloud except to any extent as may be affirmatively indicated.

PROCESSOR SET 610 includes one, or more, computer processors of any type now known or to be developed in the future. Processing circuitry 620 may be distributed over multiple packages, for example, multiple, coordinated integrated circuit chips. Processing circuitry 620 may implement multiple processor threads and/or multiple processor cores. Cache 621 is memory that is located in the processor chip package(s) and is typically used for data or code that should be available for rapid access by the threads or cores running on processor set 610. Cache memories are typically organized into multiple levels depending upon relative proximity to the processing circuitry. Alternatively, some, or all, of the cache for the processor set may be located "off chip." In some computing environments, processor set 610 may be designed for working with qubits and performing quantum computing.

Computer readable program instructions are typically loaded onto computer 601 to cause a series of operational steps to be performed by processor set 610 of computer 601 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 621 and the other storage media discussed below. The program instructions, and associated data, are accessed by processor set 610 to control and direct performance of the inventive methods. In computing environment 600, at least some of the instructions for performing the inventive methods may be stored in vector bypass generative adversarial visual inspection training program 616 in persistent storage 613.

COMMUNICATION FABRIC 611 is the signal conduction path that allows the various components of computer 601 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 612 is any type of volatile memory now known or to be developed in the future. Examples include dynamic type random access memory (RAM) or static type RAM. Typically, volatile memory 612 is characterized by random access, but this is not required unless affirmatively indicated. In computer 601, the volatile memory 612 is located in a single package and is internal to computer 601, but, alternatively or additionally, the volatile memory may be distributed over multiple packages and/or located externally with respect to computer 601.

PERSISTENT STORAGE 613 is any form of non-volatile storage for computers that is now known or to be developed in the future. The non-volatility of this storage means that the stored data is maintained regardless of whether power is being supplied to computer 601 and/or directly to persistent storage 613. Persistent storage 613 may be a read only memory (ROM), but typically at least a portion of the persistent storage allows writing of data, deletion of data and re-writing of data. Some familiar forms of persistent storage include magnetic disks and solid state storage devices. Operating system 622 may take several forms, such as various known proprietary operating systems or open source Portable Operating System Interface-type operating systems that employ a kernel. The code included in vector bypass generative adversarial visual inspection training program 616 typically includes at least some of the computer code involved in performing the inventive methods.

PERIPHERAL DEVICE SET 614 includes the set of peripheral devices of computer 601. Data communication connections between the peripheral devices and the other components of computer 601 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 623 may include components such as a display screen, speaker, microphone, wearable devices (such as goggles and smart watches), keyboard, mouse, printer, touchpad, game controllers, and haptic devices. Storage 624 is external storage, such as an external hard drive, or insertable storage, such as an SD card. Storage 624 may be persistent and/or volatile. In some embodiments, storage 624 may take the form of a quantum computing storage device for storing data in the form of qubits. In embodiments where computer 601 is required to have a large amount of storage (for example, where computer 601 locally stores and manages a large database) then this storage may be provided by peripheral storage devices designed for storing exceptionally large amounts of data, such as a storage area network (SAN) that is shared by multiple, geographically distributed computers. IoT sensor set 625 is made up of sensors that can be used in Internet of Things applications. For example, one sensor may be a thermometer and another sensor may be a motion detector.

NETWORK MODDULIE 615 is the collection of computer software, hardware, and firmware that allows computer 601 to communicate with other computers through WAN 602. Network module 615 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 615 are performed on the same physical hardware device. In other embodiments (for example, embodiments that utilize software-defined networking (SDN)), the control functions and the forwarding functions of network module 615 are performed on physically separate devices, such that the control functions manage several different network hardware devices. Computer readable program instructions for performing the inventive methods can typically be downloaded to computer 601 from an external computer or external storage device through a network adapter card or network interface included in network module 615.

WAN 602 is any wide area network (for example, the internet) capable of communicating computer data over non-local distances by any technology for communicating computer data, now known or to be developed in the future. In some embodiments, the WAN 602 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 603 is any computer system that is used and controlled by an end user (for example, a customer of an enterprise that operates computer 601) and may take any of the forms discussed above in connection with computer 601. EUD 603 typically receives helpful and useful data from the operations of computer 601. For example, in a hypothetical case where computer 601 is designed to provide a recommendation to an end user, this recommendation would typically be communicated from network module 615 of computer 601 through WAN 602 to EUD 603. In this way, EUD 603 can display, or otherwise present, the recommendation to an end user. In some embodiments, EUD 603 may be a client device, such as thin client, heavy client, mainframe computer, desktop computer and so on.

REMOTE SERVER 604 is any computer system that serves at least some data and/or functionality to computer 601. Remote server 604 may be controlled and used by the same entity that operates computer 601. Remote server 604 represents the machine(s) that collect and store helpful and useful data for use by other computers, such as computer 601. For example, in a hypothetical case where computer 601 is designed and programmed to provide a recommendation based on historical data, then this historical data may be provided to computer 601 from remote database 630 of remote server 604.

PUBLIC CLOUD 605 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 605 is performed by the computer hardware and/or software of cloud orchestration module 641. The computing resources provided by public cloud 605 are typically implemented by virtual computing environments that run on various computers making up the computers of host physical machine set 642, which is the universe of physical computers in and/or available to public cloud 605. The virtual computing environments (VCEs) typically take the form of virtual machines from virtual machine set 643 and/or containers from container set 644. It is understood that these VCEs may be stored as images and may be transferred among and between the various physical machine hosts, either as images or after instantiation of the VCE. Cloud orchestration module 641 manages the transfer and storage of images, deploys new instantiations of VCEs and manages active instantiations of VCE deployments. Gateway 640 is the collection of computer software, hardware, and firmware that allows public cloud 605 to communicate through WAN 602.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 606 is similar to public cloud 605, except that the computing resources are only available for use by a single enterprise. While private cloud 606 is depicted as being in communication with WAN 602, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 605 and private cloud 606 are both part of a larger hybrid cloud.

The computer 601 in some embodiments also hosts one or more machine learning models such as a visual inspection machine learning model. A machine learning model in one embodiment is stored in the persistent storage 613 of the computer 601. A received data sample is input to the machine learning model via an intra-computer transmission within the computer 601, e.g., via the communication fabric 611, to a different memory region hosting the machine learning model.

In some embodiments, one or more machine learning models are stored in computer memory of a computer positioned remotely from the computer 601, e.g., in a remote server 604 or in an end user device 603. In this embodiment, the program 616 works remotely with this machine learning model to train same. Training instructions are sent via a transmission that starts from the computer 601, passes through the WAN 602, and ends at the destination computer that hosts the machine learning model. Thus, in some embodiments the program 616 at the computer 601 or another instance of the software at a central remote server performs routing of training instructions to multiple server/geographical locations in a distributed system.

In such embodiments, a remote machine learning model is configured to send its output back to the computer 601 so that inference and computer vision results from using the trained model to analyze a new sample is provided and presented to a user. The machine learning model receives a copy of the new image sample, performs computer vision on the received sample, and transmits the results, e.g., an image with a highlighted detected feature, back to the computer 601.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," "includes," "including," "has," "have," "having," "with," and the like, when used in this specification, specify the presence of stated features, integers, steps, operations, elements, and/or components, but does not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

The flowchart and block diagrams in the Figures illustrate the architecture, functionality, and operation of possible implementations of systems, methods, and computer program products according to various embodiments. In this regard, each block in the flowchart, pipeline, and/or block diagrams may represent a module, segment, or portion of instructions, which comprises one or more executable instructions for implementing the specified logical function(s).

What is claimed is:

1. A computer-implemented method comprising:

training a visual inspection machine learning model using a generative adversarial network; and implementing within the generative adversarial network a vector bypass through which a vector embedding representation of an unlabeled image is transmitted around the visual inspection machine learning model and to a generator to assist with image reconstruction, wherein the vector embedding representation comprises a one-dimensional hidden embedding representing an image secondary feature of the unlabeled image.

2. The computer-implemented method of claim 1, wherein the training comprises:

inputting the unlabeled image into the visual inspection machine learning model to produce a segmentation result;

inputting the unlabeled image into an embedding vector model to produce the vector embedding representation;

inputting the vector embedding representation and the segmentation result into the generator so that the generator produces a reconstructed image;

inputting an unpaired ground-truth image and the segmentation result into a discriminator of the generative adversarial network;

optimizing a first loss for the generative adversarial network, wherein the generative adversarial network comprises the visual inspection machine learning model and the discriminator; and optimizing a second loss for the visual inspection machine learning model and the generator based on a comparison of the reconstructed image and the unlabeled image.

3. The computer-implemented method of claim 2, wherein the unlabeled image and the unpaired ground-truth image contain a common feature.

4. The computer-implemented method of claim 2, wherein the discriminator produces predictions regarding origin of input data as the unpaired ground-truth image or as the input segmentation result.

5. The computer-implemented method of claim 2, wherein the optimizing the first loss comprises performing backpropagation on a min-max loss in which the visual inspection machine learning model seeks to minimize the min-max loss and the discriminator seeks to maximize the min-max loss.

6. The computer-implemented method of claim 2, wherein the segmentation result comprises an identification of a first feature shown in the segmentation result and in the unlabeled image.

7. The computer-implemented method of claim 2, wherein the second loss is a cycle consistency loss.

8. The computer-implemented method of claim 2, wherein the optimizing of the first loss comprises performing an L2 regularization.

9. The computer-implemented method of claim 2, wherein the vector embedding representation captures a first feature from the unlabeled image and the first feature is not present in the unpaired ground-truth image.

10. The computer-implemented method of claim 9, wherein the first feature is selected from a group consisting of a texture, a color, and a brightness.

11. The computer-implemented method of claim 9, wherein the first feature is a background feature.

12. The computer-implemented method of claim 9, wherein the visual inspection machine learning model attempts to produce the segmentation result to lack the first feature.

13. The computer-implemented method of claim 1, further comprising performing image inspection on a new image by inputting the new image to the trained visual inspection machine learning model.

14. The computer-implemented method of claim 1, further comprising performing supervised training of the visual inspection machine learning model by submitting a labeled image sample to the visual inspection machine learning model.

15. The computer-implemented method of claim 1, wherein the visual inspection machine learning model performs image segmentation.

16. A computer system comprising:

one or more processors, one or more computer-readable memories, and program instructions stored on at least one of the one or more computer-readable memories for execution by at least one of the one or more processors to cause the computer system to:

train a visual inspection machine learning model using a generative adversarial network; and implement within the generative adversarial network a vector bypass through which a vector embedding representation of an unlabeled image is transmitted around the visual inspection machine learning model and to a generator to assist with image reconstruction, wherein the vector embedding representation comprises a one-dimensional hidden embedding representing an image secondary feature of the unlabeled image.

17. The computer system of claim 16, wherein the training comprises:

inputting the unlabeled image into the visual inspection machine learning model to produce a segmentation result;

inputting the unlabeled image into an embedding vector model to produce the vector embedding representation;

inputting the vector embedding representation and the segmentation result into the generator so that the generator produces a reconstructed image;

inputting an unpaired ground-truth image and the segmentation result into a discriminator of the generative adversarial network;

optimizing a first loss for the generative adversarial network, wherein the generative adversarial network comprises the visual inspection machine learning model and the discriminator; and optimizing a second loss for the visual inspection machine learning model and the generator based on a comparison of the reconstructed image and the unlabeled image.

18. A computer program product comprising:

a non-transitory computer-readable storage medium, and program instructions embodied with the non-transitory computer-readable storage medium, the program instructions executable by a computer to cause the computer to:

train a visual inspection machine learning model using a generative adversarial network; and implement within the generative adversarial network a vector bypass through which a vector embedding representation of an unlabeled image is transmitted around the visual inspection machine learning model and to a generator to assist with image reconstruction, wherein the vector embedding representation comprises a one-dimensional hidden embedding representing an image secondary feature of the unlabeled image.

19. The computer program product of claim 18, wherein the training comprises:

inputting the unlabeled image into the visual inspection machine learning model to produce a segmentation result;

inputting the unlabeled image into an embedding vector model to produce the vector embedding representation;

inputting the vector embedding representation and the segmentation result into the generator so that the generator produces a reconstructed image;

inputting an unpaired ground-truth image and the segmentation result into a discriminator of the generative adversarial network;

optimizing a first loss for the generative adversarial network, wherein the generative adversarial network comprises the visual inspection machine learning model and the discriminator; and optimizing a second loss for the visual inspection machine learning model and the generator based on a comparison of the reconstructed image and the unlabeled image.

20. The computer program product of claim 19, wherein:

the second loss is a cycle consistency loss, and the optimizing of the first loss comprises performing an L2 regularization.

* * * * *